United States Patent
Wu et al.

(10) Patent No.: US 10,673,854 B2
(45) Date of Patent: Jun. 2, 2020

(54) PROACTIVELY LIMITING FUNCTIONALITY

(71) Applicant: Amazon Technologies, Inc., Seattle, WA (US)

(72) Inventors: Felix Wu, Seattle, WA (US); Rohan Mutagi, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 113 days.

(21) Appl. No.: 15/702,257

(22) Filed: Sep. 12, 2017

(65) Prior Publication Data
US 2019/0081949 A1    Mar. 14, 2019

(51) Int. Cl.
*H04L 12/26* (2006.01)
*H04L 29/06* (2006.01)
(Continued)

(52) U.S. Cl.
CPC .......... *H04L 63/10* (2013.01); *G06F 8/62* (2013.01); *G06F 9/4451* (2013.01); *G06F 21/552* (2013.01); *G06F 21/554* (2013.01); *G06F 21/60* (2013.01); *G06F 40/40* (2020.01); *G10L 13/02* (2013.01); *G10L 15/26* (2013.01); *H04L 63/20* (2013.01); *H04L 67/22* (2013.01); *H04L 67/306* (2013.01); *H04W 12/0027* (2019.01); *G06F 11/3438* (2013.01); *G06F 21/50* (2013.01); *G06F 21/6245* (2013.01); *G10L 13/00* (2013.01); *G10L 15/00* (2013.01)

(58) Field of Classification Search
None
See application file for complete search history.

(56) References Cited

U.S. PATENT DOCUMENTS

| | | | |
|---|---|---|---|
| 2004/0166832 A1* | 8/2004 | Portman | G06Q 30/02 455/412.1 |
| 2010/0017505 A1 | 1/2010 | Kamada et al. | |

(Continued)

FOREIGN PATENT DOCUMENTS

WO    2013055501 A1    4/2013

OTHER PUBLICATIONS

International Search Report and Written Opinion in PCT/US2018/049837, dated Nov. 15, 2018.

(Continued)

*Primary Examiner* — Brandon S Hoffman
(74) *Attorney, Agent, or Firm* — Pierce Atwood LLP

(57) ABSTRACT

Systems and methods for proactively deleting applications and/or deactivating permissions granted thereto are described. A system determines a user's usage pattern of an application. The system also determines a standard usage pattern associated with the application. The standard usage pattern may be determined from application usage patterns of multiple users of the system. When the user's usage pattern deviates from the standard usage pattern, the system may cause the application to be deleted from one or more of the user's devices. The system may also deactivate user permissions associated with the application when the user's usage pattern deviates from the standard usage pattern. The system also outputs an indication to the user soliciting whether the system to re-download the application and/or reactivate the permissions.

20 Claims, 12 Drawing Sheets

(51) Int. Cl.
  *H04L 29/08* (2006.01)
  *G10L 15/26* (2006.01)
  *G10L 13/02* (2013.01)
  *G06F 8/61* (2018.01)
  *G06F 9/445* (2018.01)
  *G06F 21/60* (2013.01)
  *G06F 21/55* (2013.01)
  *H04W 12/00* (2009.01)
  *G06F 40/40* (2020.01)
  *G06F 11/34* (2006.01)
  *G10L 15/00* (2013.01)
  *G06F 21/50* (2013.01)
  *G06F 21/62* (2013.01)
  *G10L 13/00* (2006.01)

(56) References Cited

U.S. PATENT DOCUMENTS

2015/0163121 A1* 6/2015 Mahaffey ............ G06F 11/0766
                                                707/687
2015/0333982 A1   11/2015 Kang et al.
2017/0099292 A1    4/2017 Kelley et al.
2017/0149795 A1*  5/2017 Day, II .................... H04W 4/02

OTHER PUBLICATIONS

International Preliminary Report on Patentability issued Mar. 26, 2020 in PCT/US2018/049387.

* cited by examiner

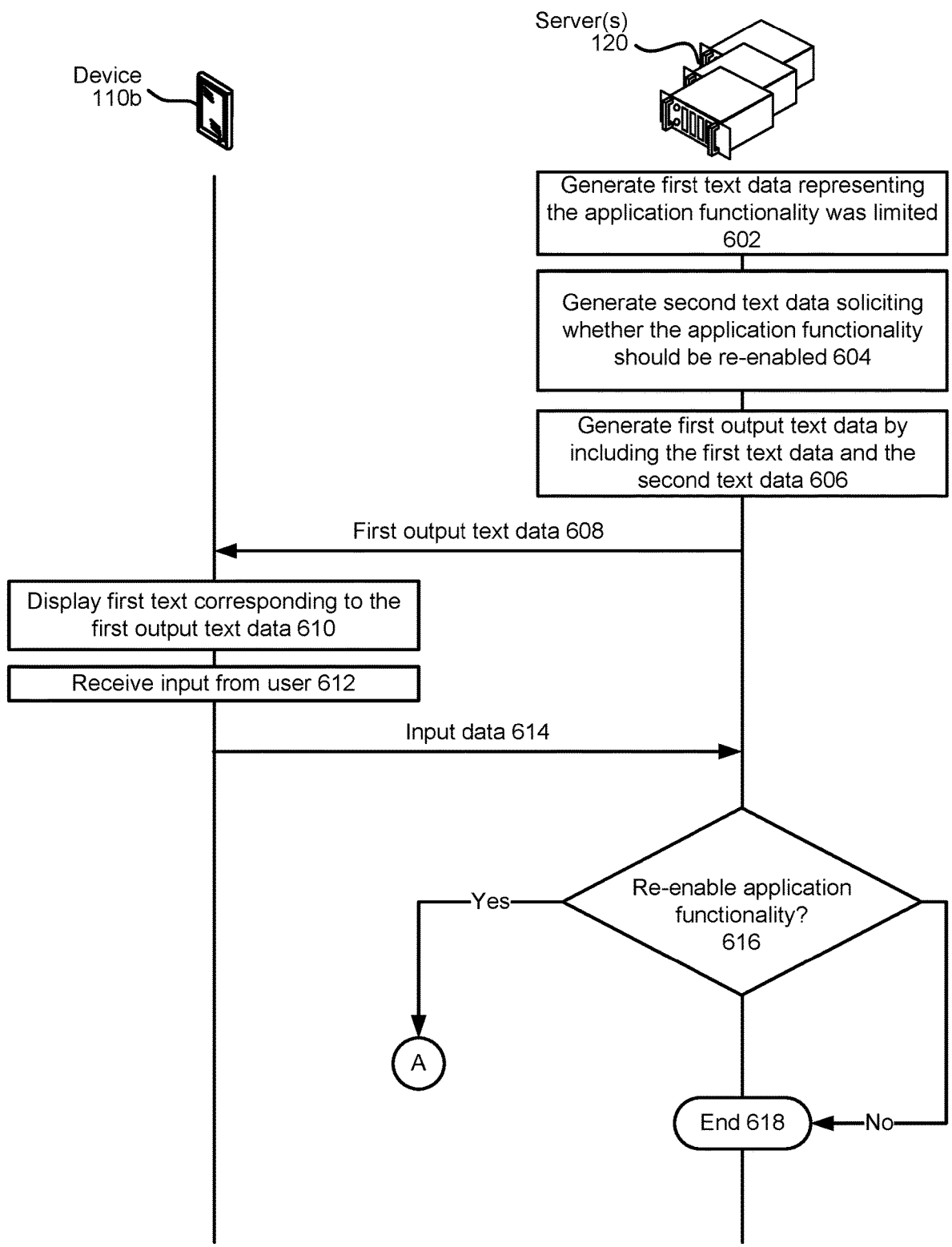

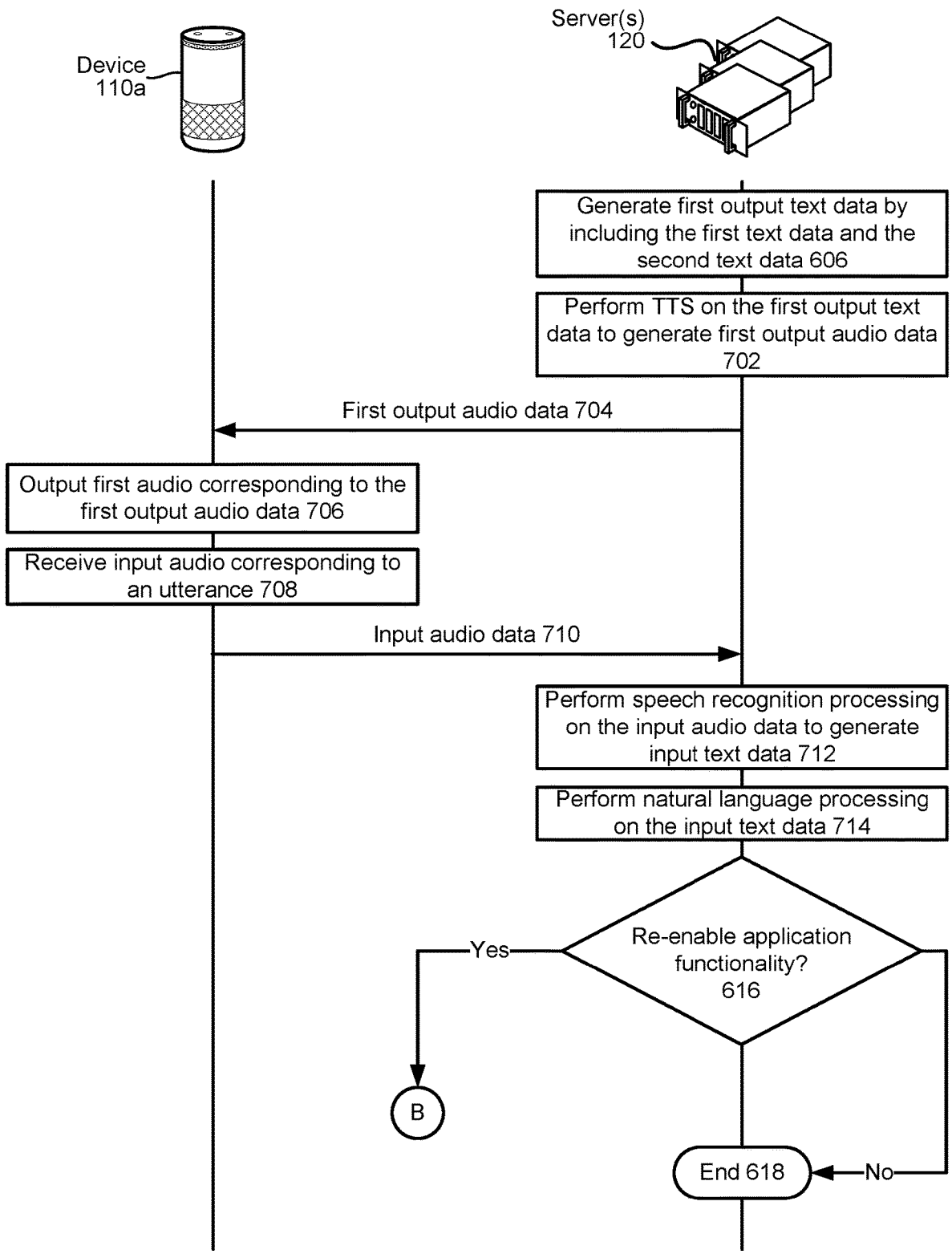

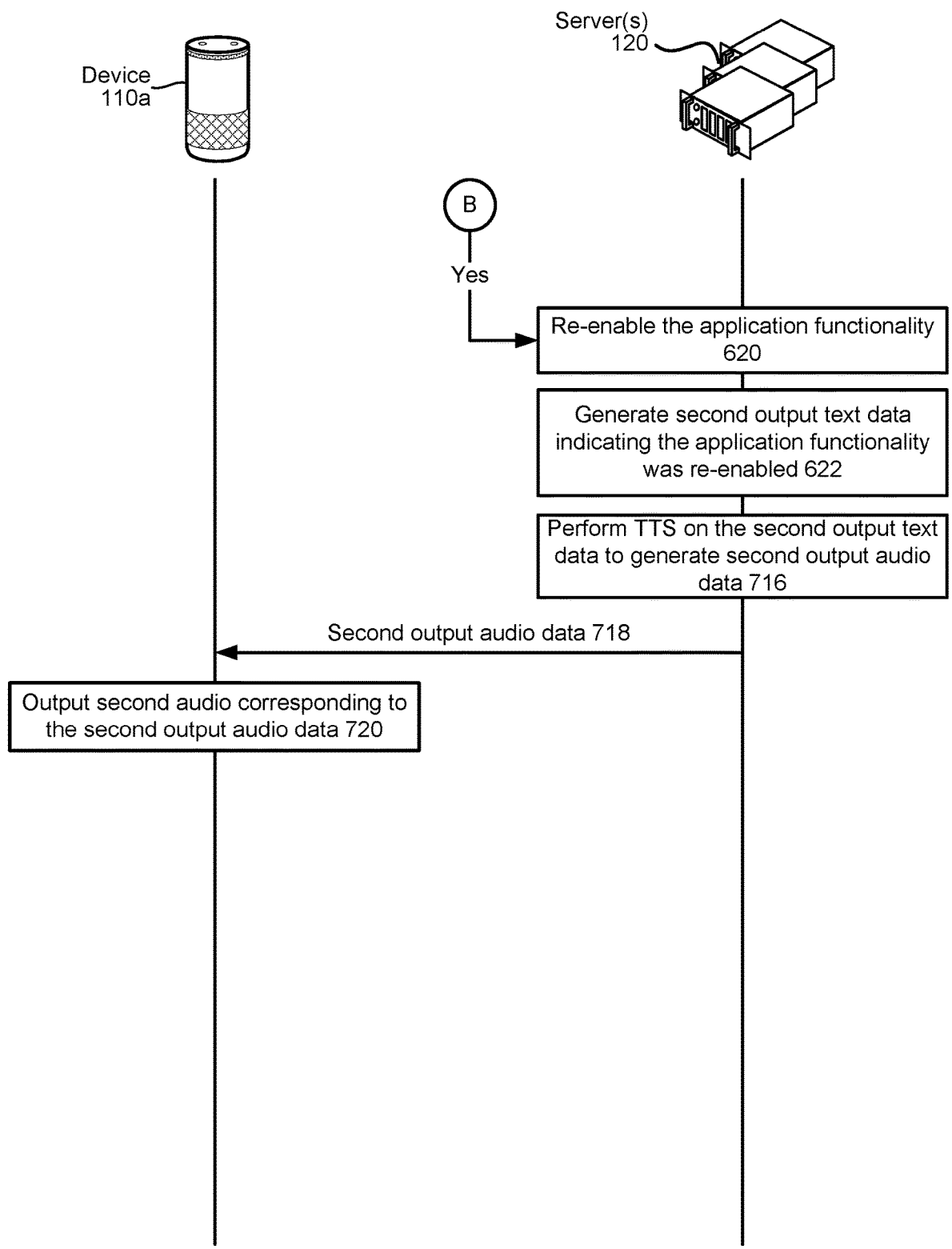

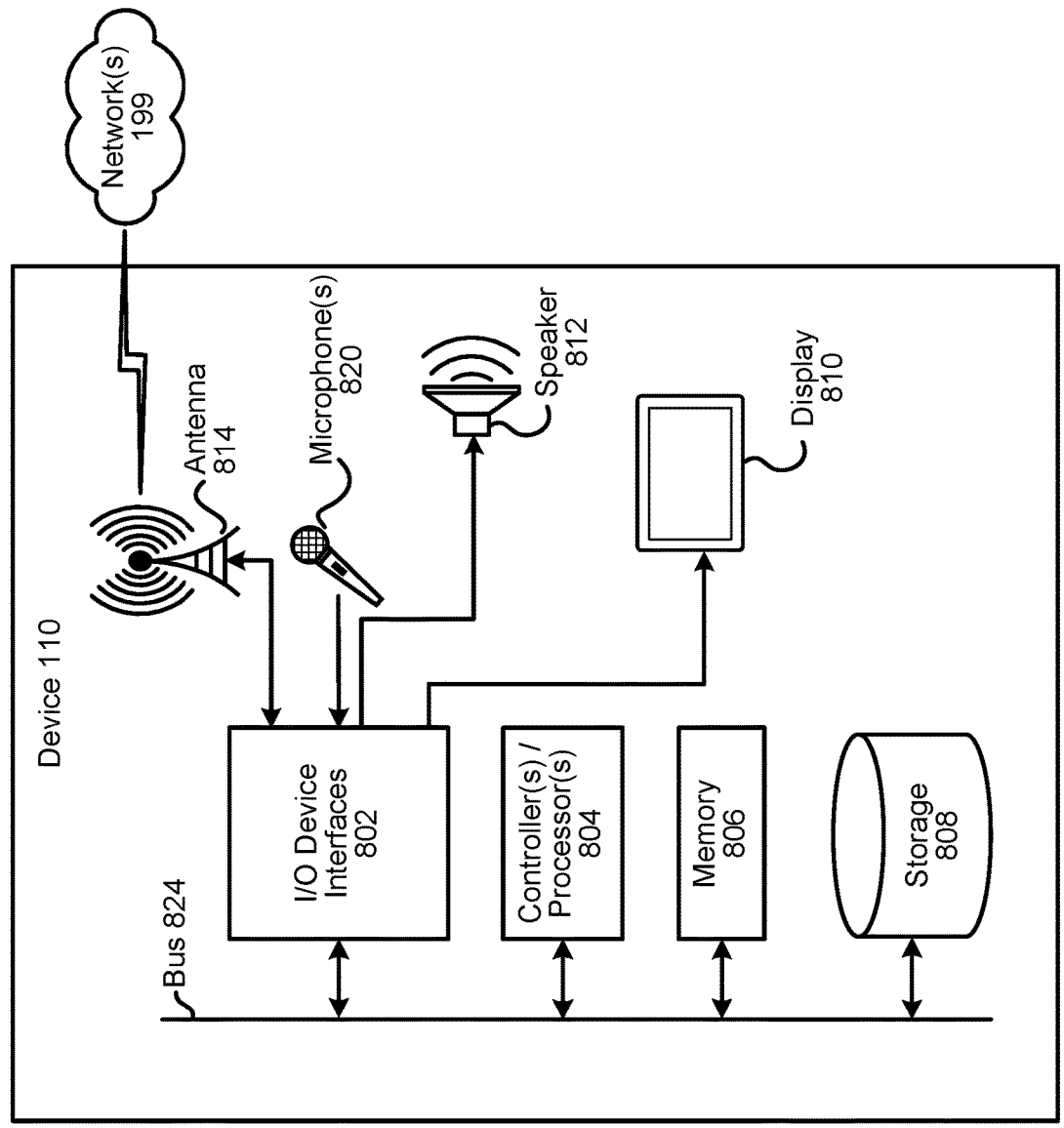

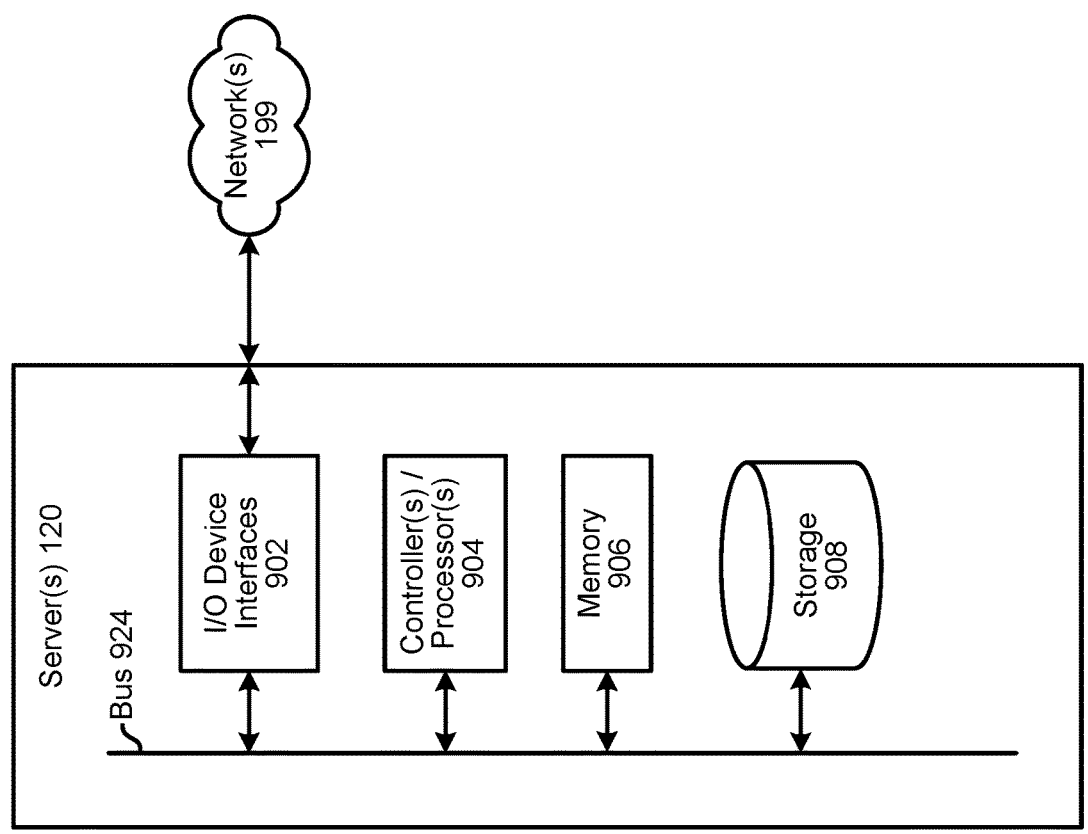

US 10,673,854 B2

PROACTIVELY LIMITING FUNCTIONALITY

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 6A and 6B are a signal flow diagram illustrating the visible solicitation of a user as to whether the application and/or permissions should be reactivated and/or re-downloaded according to embodiments of the present disclosure.

FIGS. 7A and 7B are a signal flow diagram illustrating the audible solicitation of a user as to whether the application and/or permissions should be reactivated and/or re-downloaded according to embodiments of the present disclosure.

FIG. 8 is a block diagram conceptually illustrating example components of a device according to embodiments of the present disclosure.

FIG. 9 is a block diagram conceptually illustrating example components of a server according to embodiments of the present disclosure.

DETAILED DESCRIPTION

Figure 1:
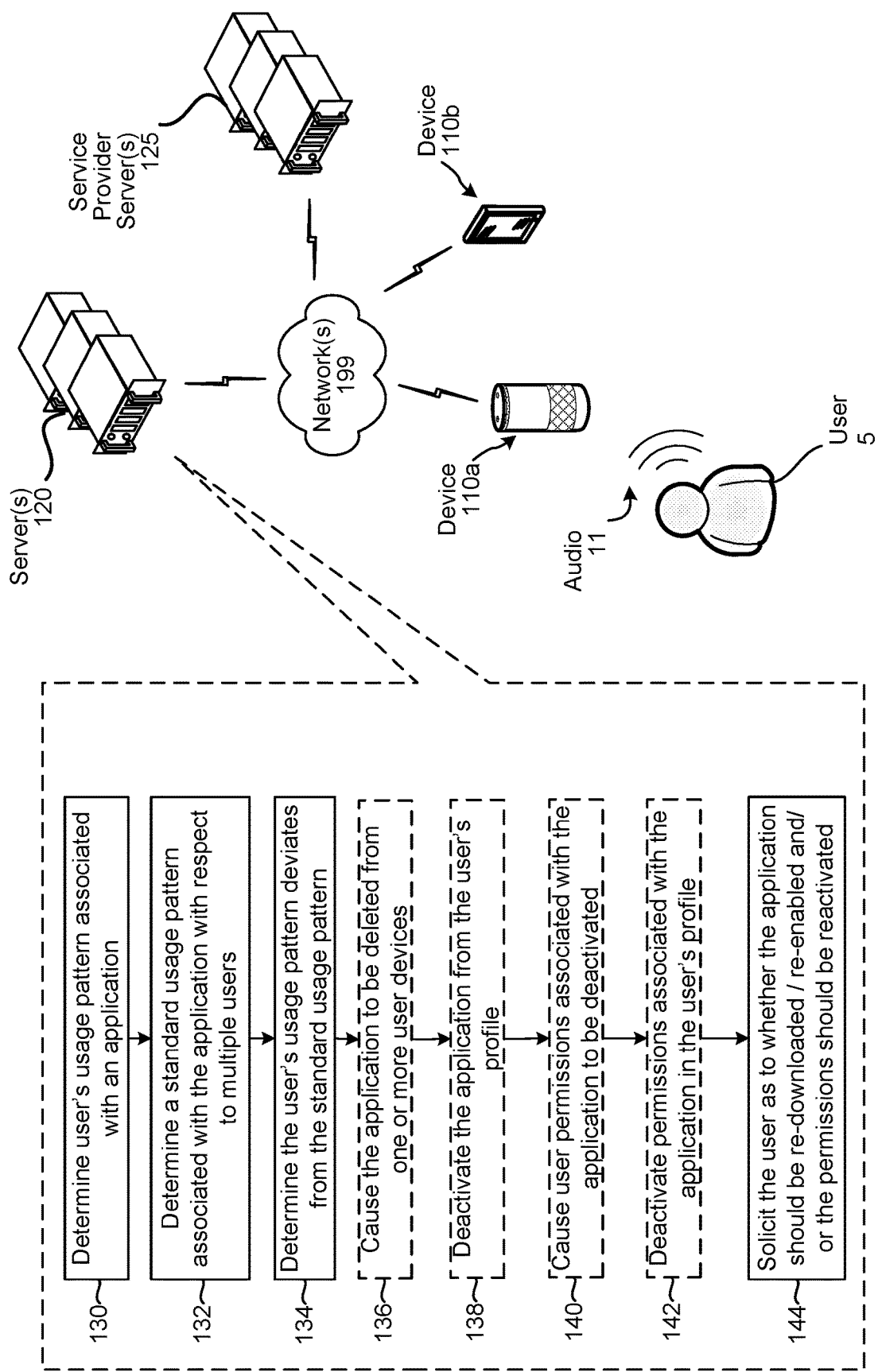
FIG. 1 illustrates a system configured to proactively delete applications from user devices and/or deactivate user permissions associated with applications according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A user may download one or more applications to a computing device. A user may also enable an application to operate for one or more computing devices without necessarily downloading them, such as in the circumstance of a local device that access a remote server over a network connection (e.g., a cloud service) where the remote server may coordinate the operation of different enabled applications with regard to the local device. Such applications include, for example, social media applications, music streaming applications, global positioning system (GPS) applications, and the like. The user may grant permissions to the applications, enabling the applications to access user specific information. Such user specific information may include device location information, bank account information, etc. Sometimes, a user will download and/or enable an application, grant the application permissions to user specific information, and thereafter forget about the application and/or the permissions granted thereto. This enables applications not used by a user to have continued access to the user's information, which may be undesirable from the user's perspective.

The present disclosure provides a system for proactively limiting the functionality with regard to particular applications. Enabling functionality may include, but is not necessarily limited to, downloading an application, enabling/associating an application with respect to one or more devices, profiles or accounts, granting permissions to an application (such as allowing an application to access certain information), expanding existing permissions of an application, or the like. Limiting functionality may include, but is not necessarily limited to, deleting an application from a device, deactivating/disassociating an application with respect to one or more devices, profiles, or accounts, deactivating permissions to an application (such as no longer allowing an application to access certain information), reducing, deactivating or otherwise circumscribing existing permissions of an application (for example limiting them on the basis of time, user, data sensitivity, etc.) or the like.

The system may perform various operations to determine how and when to proactively limit the functionality of a particular application. For example, the system determines a user's usage pattern of an application. The system also determines a standard usage pattern associated with the application. The standard usage pattern may be determined from application usage patterns of multiple users of the system. When the user's usage pattern deviates from the standard usage pattern, the system may cause the application to be deleted from one or more of the user's devices. The system may also deactivate user permissions associated with the application when the user's usage pattern deviates from the standard usage pattern. The system thus prevents potential undesired access of applications to user information even though the user may have forgotten about the application and/or the permissions granted thereto.

Some computing devices may be configured to restrict access to user data. For example, a user's smart phone may receive an indication to launch an application. In response, the smart phone may prompt the user as to whether the user wants to grant the application permission to certain user information, such as location information. In contrast, the system of the present disclosure is concerned with minimizing an application's access to user information after the user has already granted the application permission to such information.

FIG. 1 illustrates a system configured to proactively limit an application's functionality. Although the figures and discussion illustrate certain operational steps of the system in a particular order, the steps described may be performed in a different order (as well as certain steps removed or added) without departing from the intent of the disclosure. As illustrated in FIG. 1, devices (110a/110b) local to a user 5, one or more servers 120, and one or more service provider servers 125 may be connected across one or more networks 199. The server(s) 120 (which may be one or more different physical devices) may be capable of performing traditional speech processing (e.g., speech recognition processing such as ASR, natural language processing such as NLU, command processing, etc.) as well as other operations. A single server 120 may perform all speech processing or multiple servers 120 may combine to perform all speech processing. Further, the server(s) 120 may execute certain commands, such as answering spoken utterances of users 5 and operating other devices (e.g., light switches, appliances, etc.).

As illustrated in FIG. 1, a user 5 provides an indication to a device (110a/110b) to download an application. The device (110a/110b) sends a request for the application to a server(s) (e.g., the server(s) 120 or the service provider server(s) 125). In one example, the server(s) 120 may enable the application with respect to the device 110a without sending data corresponding to the application to the device 110a. According to this example, the user 5 engages the device 110a to interact with the application, the device 110a sends data to the server(s) 120 corresponding to a user command, the server(s) 120 executes the user command with respect to the application, and the server(s) 120 sends data responsive to the user command to the device 110a for output to the user 5. In another example, the service provider server(s) 125 may send data corresponding to the application to the device 110b. According to this example, the user 5 engages the device 110b to interact with the application and the device 110b executes processes with respect to the command. Thus, according to this example, the service provider server(s) 125 may not be communicated with to execute processes associated with the application.

Once the application is either enabled by the server(s) 120 or downloaded to the device 110b from the service provider server(s) 125, the user 5 may interact with the application over time. The user may interact with some applications on a daily basis, and other applications on a less frequently basis (e.g., weekly, monthly, etc.) At some point in time after the server(s) 120 enables the application or the device 110b downloads the application, the server(s) 120 determines (130) the user's usage pattern associated with the application.

The server(s) 120 also determines (132) a standard usage pattern associated with the application with respect to multiple users of the system. The system may have multiple users that use the application. Each user may use the application in a different frequency. The server(s) 120 may determine the standard usage pattern across the usage frequencies of all (or a portion) of the users that operate the application. For example, the system may determine how often particular users, on average, operate a particular application or other information about general usage of an application.

The server(s) 120 may determine (134) the user's usage pattern deviates from the standard usage pattern, for example greater than a standard deviation or other threshold. For example, the server(s) 120 may determine the user 5 uses the application more often than as indicated by the standard usage pattern. Alternatively, the server(s) 120 may determine the user 5 uses the application less frequently than as indicated by the standard usage pattern.

The server(s) 120 may cause (136) the application to be deleted from one or more of the user's devices if the server(s) 120 determines the user uses the application less frequently than as indicated by the standard usage pattern. For example, if the device 110b downloaded the application from the service provider server(s) 125, the server(s) 120 may cause the device 110b to delete the application. The server(s) 120 may cause the application to be deleted from each user device having the application downloaded thereon. User devices and applications downloaded thereon may be represented in a user profile stored and/or maintained by the server(s) 120.

The server(s) 120 may also deactivate (138) the application with respect to the user's profile. For example, if the server(s) 120 enabled the application and executes functions associated with the application in response to receiving user commands from the device 110a, the server(s) 120 may deactivate the application in the user's profile (e.g., delete an association between the user's profile and the application), thereby preventing the server(s) 120 from thereafter processing user commands received from the device 110a and associated with the application.

The server(s) 120 may additionally cause (140) user permissions associated with the application to be deactivated. For example, if the device 110b downloaded the application from the service provider server(s) 125, the server(s) 120 may cause the device 110b to deactivate permissions granted to the application. The server(s) 120 may cause the permissions to be deactivated from each user device having the application downloaded thereon.

The server(s) 120 may further deactivate (142) user permissions associated with the application within the user's profile. For example, if the server(s) 120 enabled the application and executes functions associated with the application in response to receiving user commands from the device 110a, the server(s) 120 may deactivate permissions associated with the application in the user's profile, thereby preventing the server(s) 120 from thereafter providing the application with user specific data.

Upon deletion of the application, deactivation of the application, or deactivation of the permissions, the server(s) 120 solicits (144) the user as to whether the application should be re-downloaded/re-enabled/restored and/or whether the permissions should be reactivated. If the user indicates such, the server(s) 120 re-downloads/re-enables the application and/or reactivates the permissions depending.

As described above, the system may limit the functionality of an application(s) and/or permission(s) with respect to a single user profile. A user profile storage of the system may be configured with one or more customer profiles, with each customer profile encompassing multiple user profiles. A customer profile may include permissions, etc. shared by all of the user profiles encompassed by the customer profile. The system may limit the functionality an application(s) and/or permission(s) with respect to a customer profile, which results in the system limiting the functionality of the application with respect to multiple user profiles at once.

The system may limit the functionality of an application by directly deleting and/or deactivating the application, by directly removing or disabling permissions of the application, by directly disassociating/unlinking the application from a device, profile or account, etc. The system may also limit the functionality of an application by causing such activities to occur, for example by sending an instruction to another device or component to perform the actions to limit the functionality of the application.

Figure 2:
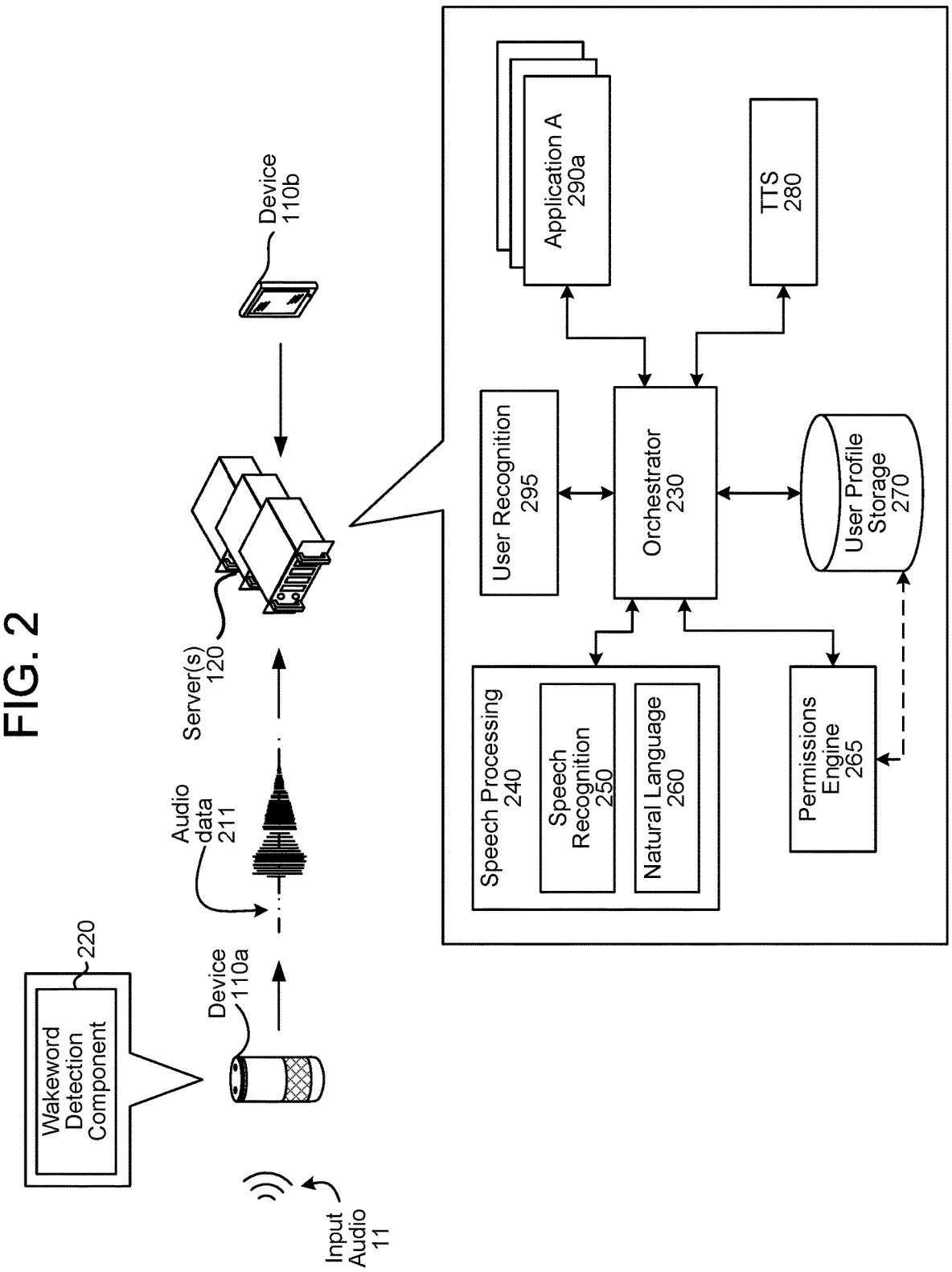
FIG. 2 is a diagram of components of a system according to embodiments of the present disclosure.

The system may operate using various components as described in FIG. 2. The various components illustrated FIG. 2 may be located on a same or different physical devices. Communication between various components illustrated in FIG. 2 may occur directly or across a network(s) 199.

An audio capture component, such as a microphone or array of microphones of the device 110a or other device, captures input audio 11 corresponding to a spoken utterance. The device 110a, using a wakeword detection component 220, processes audio data corresponding to the input audio 11 to determine if a keyword (e.g., a wakeword) is detected in the audio data. Following detection of a wakeword, the device 110a sends audio data 211, corresponding to the utterance, to a server(s) 120 for processing.

Upon receipt by the server(s) 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech processing component 240. A speech recognition component 250 of the speech processing component 240 transcribes the audio data 211 into one more textual interpretations representing speech contained in the audio data 211. The speech recognition component 250 interprets the spoken utterance based on a similarity between the spoken utterance and pre-established language models. For example, the speech recognition component 250 may compare the audio data 211 with models for sounds (e.g., subword units or phonemes) and sequences of sounds to identify words that match the sequence of sounds spoken in the utterance represented in the audio data 211.

Alternatively, a keyboard (e.g., presented on a touch sensitive display) of a device 110b may capture textual input corresponding to a user command. The device 110b may generate text data corresponding to the input text, and may send the text data to the server(s) 120. Upon receipt by the server(s) 120, the text data may be sent to the orchestrator component 230.

The orchestrator component 230 sends the text data to a natural language component 260 of the speech processing component 240. If the user command was received by the server(s) 120 as audio data from the device 110a, the speech recognition component 250 sends text data generated using speech recognition processing to the natural language component 260. The text data sent from the speech recognition component 250 to the natural language component 260 may include a top scoring textual interpretation of the spoken utterance or may include an N-best list including a group of textual interpretations and potentially their respective scores.

The natural language component 260 attempts to make a semantic interpretation of the phrases or statements represented in the text data. That is, the natural language component 260 determines one or more meanings associated with the phrases or statements represented in the text data based on individual words represented in the text data. The natural language component 260 interprets a text string to derive an intent of the user command represented in the text data (e.g., an action that the user desires be performed) as well as pertinent pieces of information in the text data that allow a device (e.g., the device 110a, the device 110b, the server(s) 120, the service provider server(s) 125, etc.) to complete the intent. For example, if the text data corresponds to "call mom," the natural language component 260 may determine the user intended to activate a telephone in his/her device and to initiate a call with a contact matching the entity "mom."

The natural language component 260 may perform natural language understanding (NLU) operations in a manner that is specific to a particular user/user profile to ensure proper parsing of text data corresponding to the user profile. For example, the natural language component 260 may perform NLU operations using associations between a particular profile and applications that are enabled with respect to the profile. Thus, if post-ASR text data is received, the natural language component 260 may use the associations to determine if the post-ASR text data indicates an instruction to perform a certain operation using one of the enabled applications. For example, an utterance to "play music" may result in a certain enabled music-playing application 290 being indicated by the NLU results rather than a different, but non-enabled, music-playing application being indicated by the NLU results.

Limiting functionality of an application as described herein may include removing an association between the application and a user profile, which may include removing data that may be used by an NLU operation when determining how to process text data received from a device associated with the user profile. Thus, any weight NLU processing may have given to an application when enabled with respect to the user profile may be reduced (or eliminated) if an association between the application and the user profile is deactivated. Removing an association between the application and the user profile may include changing a bit/data flag value from 1 to 0 (or vice versa) where the bit/data flag indicates whether a particular application is enabled with respect to the user profile. Restoring the association may involve toggling the bit from an unassociated state (e.g., 0) to an associated state (e.g., 1). Similarly, limiting functionality of an application as described herein may include deactivating a permission for an application to access certain data corresponding to the user and/or profile. Deactivating the permission for the application may include changing a bit/data flag value from 1 to 0 (or vice versa) where the bit/data flag indicates whether the application has the respective permission with respect to the user profile. Restoring the permission may involve toggling the bit from a "not permitted" state (e.g., 0) to a "permitted" state (e.g., 1).

The server(s) 120 may include a user recognition component 295. The user recognition component 295 may take as input the audio data 211, the text data received by the server(s) 120 from the device 110b, and/or the text data output by the speech recognition component 250. The user recognition component 295 determines scores indicating whether the command represented in the audio data 211 or the text data provided by the device 110b originated from particular users. For example, a first score may indicate a likelihood that the command originated from a first user, a second score may indicate a likelihood that the command originated from a second user, etc. The user recognition component 295 also determines an overall confidence regarding the accuracy of user recognition operations. If the user command is received as audio data 211, user recognition may involve comparing speech characteristics in the audio data 211 to stored speech characteristics of users. User recognition may also involve comparing biometric data (e.g., fingerprint data, iris data, etc.) received by the user recognition component 295 to stored biometric data of users. User recognition may further involve comparing image data including a representation of at least a feature of a user with stored image data including representations of features of users. Other types of user recognition processes, including those known in the art, may also or alternatively be used. Output of the user recognition component 295 may be used to inform natural language processing as well as processing performed by 1P and 3P applications.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer identifier (ID). A customer profile may be an umbrella profile specific to a group of users. That is, a customer profile encompasses two or more individual user profiles, each associated with a unique respective user ID. For example, a customer profile may be a household profile that encompasses user profiles associated with multiple users of a single household. A customer profile may include preferences shared by all of the user profiles encompassed thereby. Each user profile encompassed under a single customer profile may include preferences specific to the user associated therewith. That is, each user profile may include preferences unique with respect to one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199. A user profile may also be stored on a device 110 and may be related to the device. Thus application functionality/permissions related to the device may be stored on the device itself. To enable/limit functionality with regard to a particular device, the system may operate on associations stored with regard to the device's user profile.

The orchestrator component 230 may send output from the natural language component 260 (e.g., text data including tags attributing meaning to the words and phrases represented in the text data), and optionally output from the user recognition component 295 and/or data from the user profile storage 270, to one or more applications 290. FIG. 2 illustrates various 1P applications 290. However, it should be appreciated that the data sent to 1P applications 290 may also be sent to 3P application servers executing 3P applications.

An "application," as used herein, may be considered synonymous with a skill. A "skill" may correspond to a domain and may be software running on a server(s) 120 that is akin to an application. That is, a skill may enable a server(s) 120 or application server(s) 125 to execute specific functionality in order to provide data or produce some other output requested by a user. The system may be configured with more than one skill. A skill may either be a 1P skill (i.e., one executed by the server(s) 120) or a 3P skill (i.e., one executed by a 3P application server(s)). For example a weather service skill may enable the server(s) 120 to execute a command with respect to a weather service server(s), a car service skill may enable the server(s) 120 to execute a command with respect to a taxi or ride sharing service server(s), an order pizza skill may enable the server(s) 120 to execute a command with respect to a restaurant server(s), etc.

The application 290 to which the orchestrator component 230 sends data may be chosen based on the output of the natural language component 260. In an example, if the natural language component 260 outputs text data associated with an intent to play music, the application 290 selected may correspond to a music playing application. In another example, if the natural language component 260 outputs text data associated with an intent to output weather information, the application 290 selected may correspond to a weather application. In yet another example, if the natural language component 260 outputs text data associated with an intent to obtain search results, the application 290 selected may correspond to a search engine application.

An application 290 may output text data to the server(s) 120. The orchestrator component 230 may send text data output by the application 290 to a TTS component 280. The TTS component 280 may synthesize speech corresponding to received text data. Audio data synthesized by the TTS component 280 may be sent to the device 110*a* (or another device including a speaker) for output to a user.

The TTS component 280 may perform speech synthesis using one or more different methods. In one method of synthesis called unit selection, the TTS component 280 matches text data or a derivative thereof against a database of recorded speech. Matching units are selected and concatenated together to form audio data. In another method of synthesis called parametric synthesis, parameters such as frequency, volume, and noise are varied by the TTS component 280 to create an artificial speech waveform output. Parametric synthesis uses a computerized voice generator, sometimes called a vocoder.

The server(s) 120 may additionally include a permissions engine 265 configured to manage the functionality of one or more applications. For example the permissions engine 265 may determine how and when to proactively limit the functionality of an application as described herein. The permissions engine 265 may take as input various signals from components controlled by the server(s) 120 as well as components separate from but in communication with the server(s) 120. The permissions engine 265 may operate continually and is not limited to be operated only when a user is interacting with the system. For example, the permissions engine 265 may determine to limit (and/or re-enable) an application's functionality based on the teachings described herein. Thereafter, a remote device (e.g., a service provider server 125) associated with an application associated with the permission may, without a user presently operating the application, send an indication to the server(s) 120 requesting user information associated with the deactivated permission. The server(s) 120 (e.g., a permission gateway component incorporated in or in communication with the permissions engine 265) may deny the request based on the permission being deactivated. The permissions engine 265 may be in communication with the orchestrator component 230 (as illustrated) or the permissions engine 265 may not interact with other components of the server(s) 120 via the orchestrator component 230 (e.g., the permissions engine 265 may communication directly with, for example, the user profile storage 270).

Figure 3:
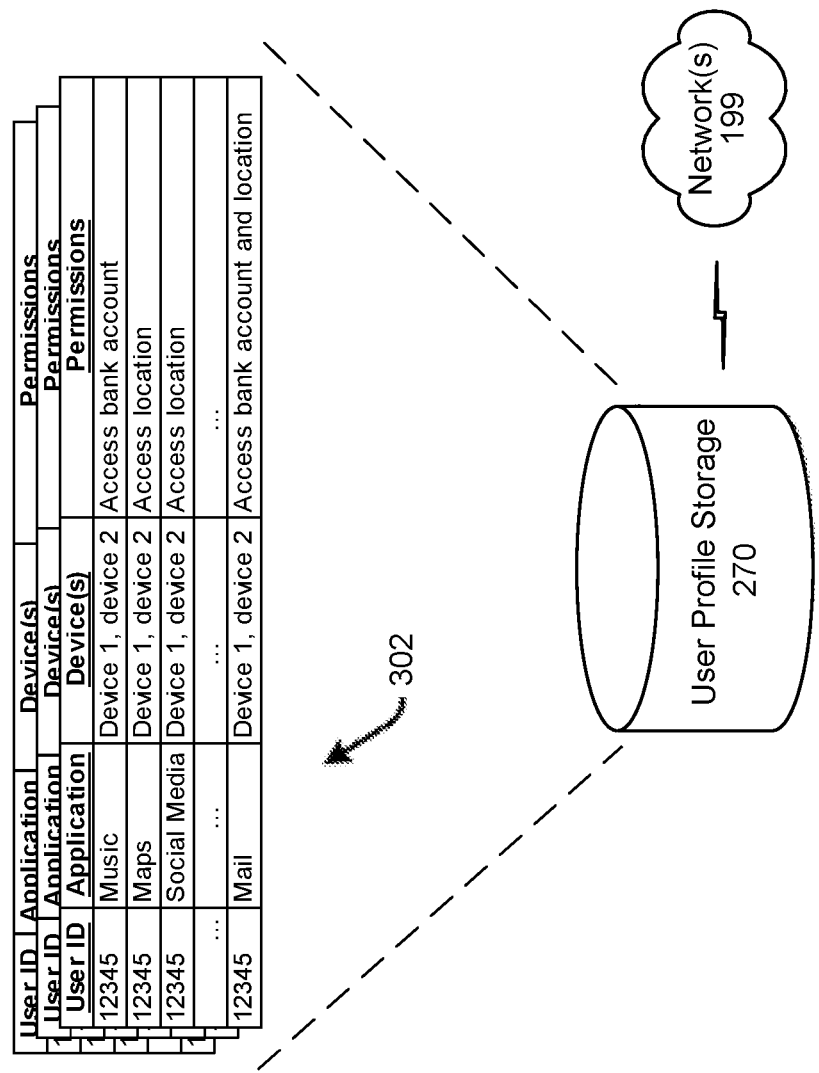
FIG. 3 illustrates data stored and associated with user profiles according to embodiments of the present disclosure.

FIG. 3 illustrates the user profile storage 270 that includes data regarding user accounts 302. For illustration, as shown in FIG. 3, each user profile 302 may include data indicating the applications enabled with respect to the user, the devices on which the applications are installed, and the permissions the user has granted with respect to each application. Each user profile 302 may additionally include other data not explicitly illustrated.

Figure 4:
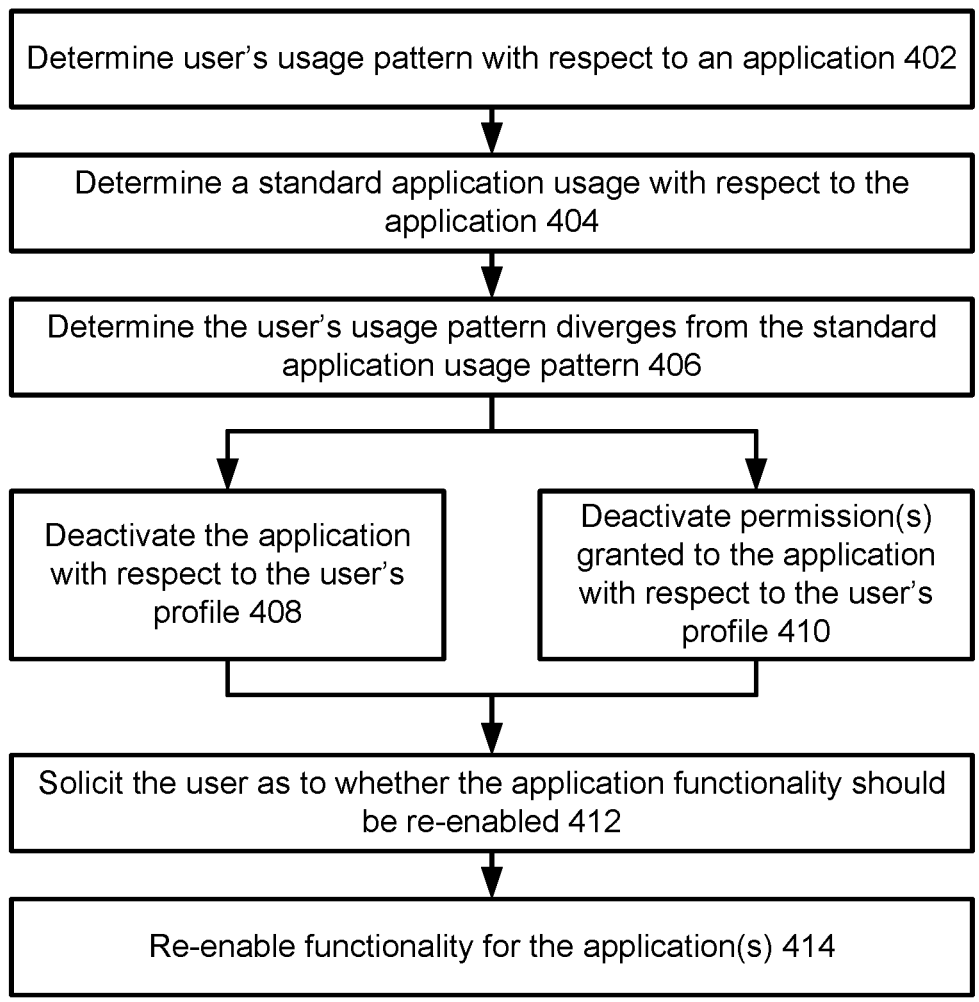
FIG. 4 is a process flow diagram illustrating a method for proactively deactivating an application and/or permissions according to embodiments of the present disclosure.

As indicated above, the server(s) 120 may execute the application when a user wants to use the application. FIG. 4 illustrates an example method wherein the server(s) 120 proactively limits the functionality of an application. The system determines (402) a user's usage pattern with respect to an application. The system may determine the user's usage pattern from a history of the user's interactions with the system. The history of the user's interactions may be associated with the user's system profile. Alternatively, the history of the user's interactions may be stored in a dedicated storage storing histories of multiple user's interactions with the system.

The system also determines (404) a standard application usage pattern with respect to the application. The standard application usage may be based on the type of application. For example, the standard application usage with respect to a social media application may indicate a typical user uses the application a minimum of once a day, the standard application usage with respect to a weather application may indicate a typical user uses the application a minimum of once a week, etc. The standard application usage may also be based on how various users of the system use the application. For example, the system may determine how often particular users, on average, operate a particular application or other information about general usage of an application. The system may compile application usages of multiple users and may normalize the usages to generate the standard application usage. The standard application usage may further be based on an application developer's expectations. For example, a social media application developer may expect a user to use a social media application at least once a day, a weather application developer may expect a user to use a weather application at least once a week, etc. The system may determine the standard application usage using other data as well.

The system (for example, the permissions engine 265) may then determine a threshold or other metric that the system may use to determine when to proactively limit functionality with regard to the application. For example, the permissions engine 265 may determine, based on the standard usage, a standard deviation from the standard usage data (e.g., a standard deviation from a mean standard usage value, where many users fall within a range from the negative standard deviation to the positive standard deviation. The permissions engine 265 may determine how many users fall outside of the standard deviation and may then set the threshold to be the standard deviation. The permissions engine 265 may also determine the threshold to be two times the standard deviation, a value in between one and two times the standard deviation, something less than the standard deviation, or a different value. Other threshold values may also be set that do not necessarily relate to the standard deviation. For example, the system may determine that a certain percentage of low activity users (e.g., 2%) should have the functionality of the application limited with regard to those users. The threshold may then be selected such that the desired percentage of users fall below the threshold. The threshold may also be based on some other predetermined amount.

The threshold may be based on usage activity, which may itself be a value corresponding to how often a user/account operates the particular application (or certain setting or permission of the application). In such an example the system may then determine a metric value for how often a particular user/account operates the particular application (or certain setting or permission of the application) and may then compare that metric value to the threshold to determine if application functionality should be limited for that user/account. The The system may determine (406) the user's usage pattern diverges from the standard application usage pattern. In this manner, the standard application usage pattern may be considered a comparison usage pattern or usage frequency. In some instances, the system may determine the user's usage pattern indicates the user uses the application more often than the standard application usage pattern. When that occurs, the system may leave the application and permissions activated. In other instances, the system may determine the user's usage pattern indicates the user uses the application less often than the standard application usage pattern. When this occurs, the system may deactivate (408) the application in the user's profile, deactivate (410) one or more permissions granted to the application in the user's profile, and/or perform other limiting of the application's functionality. The system then solicits (412) the user as to whether the functionality should be re-enabled.

The server(s) 120 may re-enable the application's functionality (414) (which may include reactivating/re-downloading (or cause to be reactivated/re-downloaded) an application and/or permission(s)) in various ways. In an example, the server(s) 120 can act on behalf of the user. That is, once the server(s) 120 receives, from the user device 110, an indication to re-enable the application's functionality, the server(s) 120 can re-enable the application's functionality without any further user involvement. In another example, the server(s) 120 cannot act on behalf of the user due to, for example, authentication requirements associated with re-enabling application functionality. For example, the server(s) 120 may receive the indication to re-enable the application functionality from the user device 110. Thereafter, the server(s) 120 may communicate with a service provider server(s) 125 to re-enable the application functionality. The service provider server(s) 125 may indicate to the server(s) 120 that the user must be authenticated prior to the service provider server(s) 125 permitting the application functionality to be restored. The server(s) 120 may then solicit the user to provide authentication input (e.g., scan a fingerprint of the user, scan an iris of the user, input a passcode or password unique to the user, etc.). Once the server(s) 120 receives authentication data from a user device 110 (or a companion application operating on the user device 110), the server(s) 120 provides the service provider server(s) 125 with the authentication data (or an indication that the user is authenticated if the server(s) 120 performs user authentication). In response, the service provider server(s) 125 permits the application functionality to be re-enabled.

Thresholding may be used to ensure the system does not limit the application functionality in undesirable circumstances. For example, the standard usage pattern for an application may indicate a typical user uses the application a minimum of 5 times a week. The user's usage pattern may indicate the user uses the application 3 times a week. According to these examples, it may be undesirable to deactivate the application and/or permissions since the user, albeit it less than typical, is nonetheless using the application. The system may implement a timing threshold to ensure the system does not deactivate the application and/or permissions in situations like the above. For example, the threshold may indicate the user must not use the application at all for a minimum threshold of time (e.g., week, month, etc.) prior to the application and/or permissions being deactivated. Different applications may be associated with different timing thresholds. For example, functionality of a first application may be limited after a period of one week of nonuse whereas functionality of a second application may be limited after a period of one month of nonuse. Moreover, different functions may be associated with different timing thresholds. For example, higher priority functions (e.g., ones related to the application accessing more sensitive user information) may be limited after a first amount of nonuse whereas lower priority functions (e.g., ones related to the application accessing less sensitive user information) may be limited after a second, longer amount of nonuse.

Figure 5:
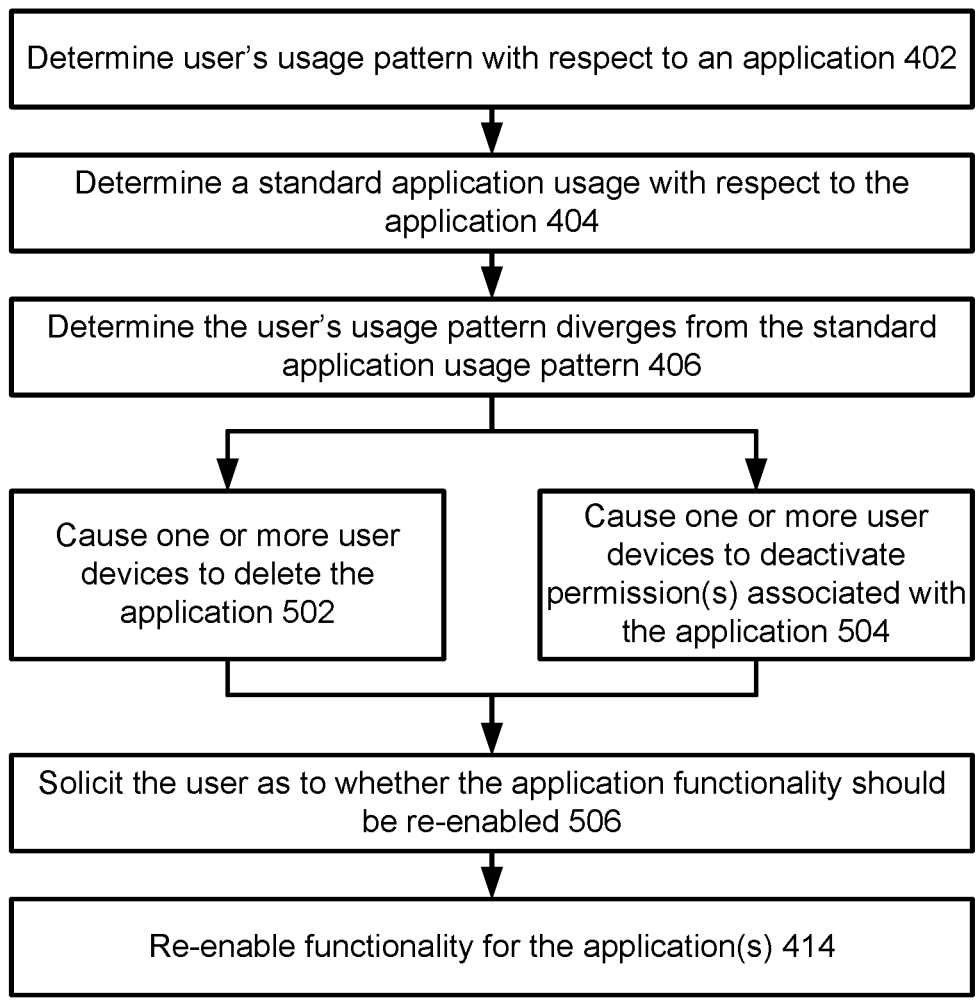
FIG. 5 is a process flow diagram illustrating a method for proactively deactivating an application and/or permissions according to embodiments of the present disclosure.

As indicated above, the device 110*b* may execute the application when a user wants to use the application. FIG. 5 illustrates a method wherein the server(s) 120 proactively causes an application's functionality to be limited. The system determines (402) a user's usage pattern with respect to an application. The system also determines (404) a standard application usage pattern with respect to the application. The standard application usage may be based on the type of application, how various users of the system use the application, an application developer's expectations, etc.

The system may determine (406) the user's usage pattern diverges from the standard application usage pattern. The system may cause (502) one or more user devices to delete the application when the system determines the user's usage pattern indicates the user uses the application less often than the standard application usage pattern. Alternatively or in addition, the system may case (504) one or more user devices to deactivate one or more permissions associated with the application when the system determines the user's usage pattern indicates the user uses the application less often than the standard application usage pattern. For example, when the system determines the user's usage pattern indicates the user uses the application less often than the standard application usage pattern, the system may access a profile associated with the user, determine the device(s) having the application downloaded thereon, and causes those devices to limit the functionality of an application. The system may also limit the functionality of an application in other ways. The system then solicits (506) the user as to whether the application's functionality should be limited. The server(s) 120 may thereafter re-enable the functionality for the application (414). As with FIG. 4, the method described with respect to FIG. 5 may also implement thresholding to ensure the system does not delete the application and/or deactivate permissions in undesirable circumstances.

Figure 6B:
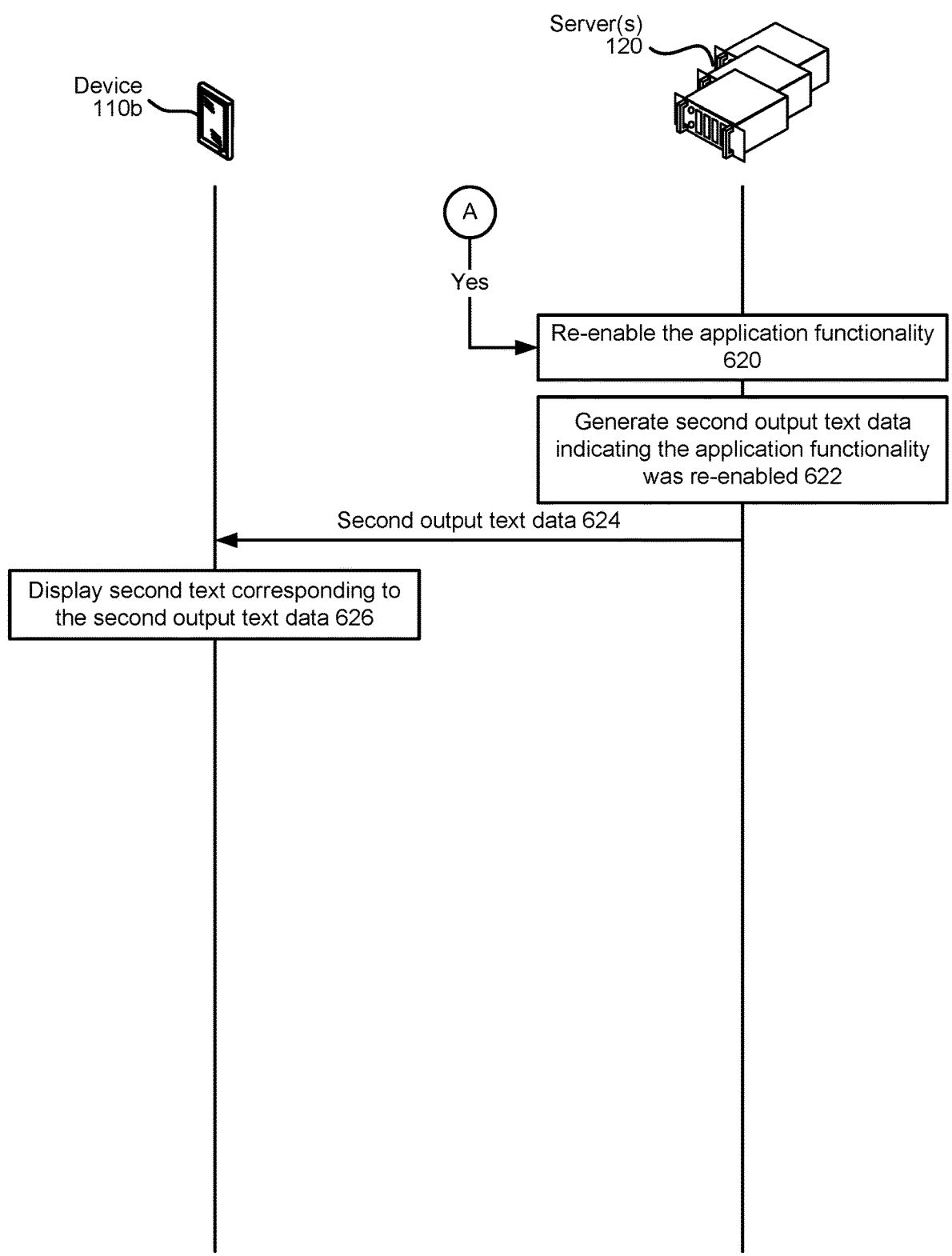

FIGS. 6A and 6B are a signal flow diagram illustrating the visual solicitation of a user regarding whether an application's functionality should be re-enabled. The server(s) 120 generates (602) first text data representing the application functionality was limited. The server(s) 120 also generates (604) second text data soliciting whether the application's functionality should be re-enabled. The server(s) 120 generates (606) first output text data by including the first text data and the second text data. The server(s) 120 sends (608) the first output text data to the device 110*b*.

The device 110*b* displays (610) first text corresponding to the first output text data. For example, the device 110*b* may display text corresponding to "I have deleted the XYZ application based on you not using it in X number of weeks. Should I re-download the application?" The text may be displayed in a banner or icon on a touch sensitive interface of the device 110*b*. The banner or icon may include a first virtual button indicating the application should be re-downloaded/restored and a second virtual button indicating the application should not be re-downloaded. The device 110*b* receives (612) input from the user. The input may correspond to the user selecting one of the virtual buttons of the banner or icon. The device 110*b* sends (614) input data corresponding to the input to the server(s) 120.

The server(s) 120 determines (616) whether the input data indicates the application functionality should be re-enabled. If the server(s) 120 determines the input data corresponds to an indication not to re-enable the application functionality, the process ends (618). Instead, if the server(s) determines the input data corresponds to an indication to re-enable the application functionality, the server(s) 120 re-enables (620) the application functionality.

The server(s) 120 generates (622) second output text data indicating the application's functionality was re-enabled and sends (624) the second output text data to the device 110*b* (or another device represented in a profile associated with the device 110*b*). The device 110*b* (or other device) displays (626) second text corresponding to the second output text data. For example, the second text may correspond to "I have re-downloaded the application to your device."

FIGS. 7A and 7B are a signal flow diagram illustrating the audible solicitation of a user regarding whether the application and/or permissions should be reactivated/re-downloaded. The server(s) 120 generates (606) the first output text data by including the first text data and the second text data. The server(s) 120 then performs (702) TTS on the first output text data to generate first output audio data. The server(s) 120 sends (704) the first output audio data to the device 110*a*.

The device 110*a* outputs (706) first audio corresponding to the first output audio data. For example, the device 110*a* may output audio corresponding to "I have deleted the XYZ application based on you not using it in X number of weeks. Should I re-download the application?" The device 110*a* receives (708) input audio corresponding to an utterance. The device 110*b* sends (710) input audio data corresponding to the input audio to the server(s) 120.

The server(s) 120 performs (712) speech recognition processing on the input audio data to generate input text data. The server(s) 120 also performs (714) natural language processing on the input text data to generate NLU results. Based on the NLU results, the server(s) 120 determines (616) whether the input data indicates the application's functionality should be re-enabled. If the server(s) 120 determines the input data corresponds to an indication not to re-enable the application's functionality, the process ends (618). Instead, if the server(s) determines the input data corresponds to an indication to re-enable the application's functionality, the server(s) 120 re-enables the application's functionality.

The server(s) 120 generates (622) second output text data indicating the application's functionality was re-enabled. The server(s) 120 performs (716) TTS on the second output text data to generate second output audio data. The server(s) 120 sends (718) the second output audio data to the device 110*a* (or another device represented in a profile associated with the device 110*a*). The device 110*a* (or other device) outputs (720) second audio corresponding to the second audio text data. For example, the second audio may correspond to "I have re-downloaded the application to your device."

Although the examples above discuss interacting with a local device through audio data (such as through a voice user interface or the like), the system may also interact with a local device (and thus with a user) through other means. For example, input data (such as input data 614/710) may be input audio data, input text data, a gesture, a button press, or other inputs. Output data (such as output data 608/624/704/

718) may include output audio data, output text data, output indicator data (such as data corresponding to a beep, light activation, haptic output, or other indicator), or other output data.

FIG. 8 is a block diagram conceptually illustrating a user device 110 that may be used with the described system. FIG. 9 is a block diagram conceptually illustrating example components of a remote device, such as the server(s) 120 that may assist with speech recognition processing, natural language processing, or command processing. Multiple servers 120 may be included in the system, such as one server 120 for performing speech recognition processing, one server 120 for performing natural language processing, etc. In operation, each of these devices (or groups of devices) may include computer-readable and computer-executable instructions that reside on the respective device (110/120), as will be discussed further below.

Each of these devices (110/120) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120) may also include a data storage component (808/908) for storing data and controller/processor-executable instructions. Each data storage component (808/908) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (802/902).

Computer instructions for operating each device (110/120) and its various components may be executed by the respective device's controller(s)/processor(s) (804/904), using the memory (806/906) as temporary "working" storage at runtime. A device's computer instructions may be stored in a non-transitory manner in non-volatile memory (906/906), storage (808/908), or an external device(s). Alternatively, some or all of the executable instructions may be embedded in hardware or firmware on the respective device in addition to or instead of software.

Each device (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may further include a display 810 configured to display content.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (802/802) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (802/902), processor(s) (804/904), memory (806/906), and/or storage (808/908) of the device(s) 110 and server(s) 120, respectively. Thus, the speech recognition component 250 may have its own I/O interface(s), processor(s), memory, and/or storage; the natural language component 260 may have its own I/O interface(s), processor(s), memory, and/or storage; and so forth for the various components discussed herein.

The server(s) may include a training component for training or creating various machine learning models, or other such items, that can be used by various components, such as the permissions engine 265. For example, models used by the permissions engine 265 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

Figure 10:
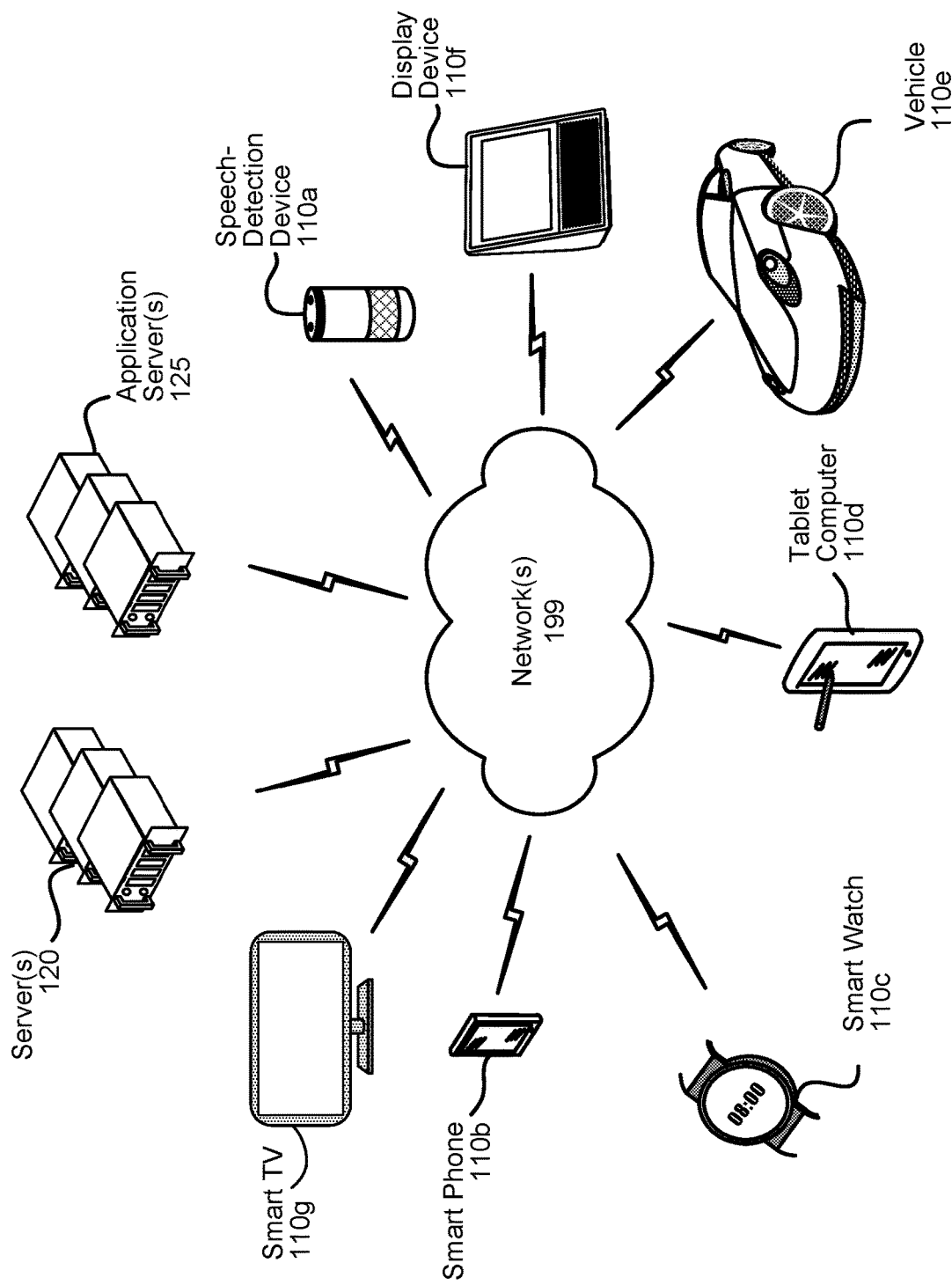
FIG. 10 illustrates an example of a computer network for use with the speech processing system.

As illustrated in FIG. 10, multiple devices (110a-110g, 120, 125) may contain components of the system 100 and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television may be connected to the network(s) 199 through a wireless service provider, over a WiFi or cellular network connection, or the like. Other devices are included as network-connected support devices, such as the server(s) 120, the application server(s) 125, or others. The support devices may connect to the network(s) 199 through a wired connection or wireless connection. Networked devices may capture audio using one-or-more built-in or connected microphones or other audio capture devices, with processing performed by speech recognition components, natural language components, or other components of the same device or another device connected via the network(s) 199, such as the speech recognition component 250, the natural language component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 220, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   determining a first usage frequency associated with an application, the first usage frequency being specific to a profile;
   determining, with respect to the application, an average usage frequency based at least in part on usage frequencies corresponding to a plurality of users;
   determining the first usage frequency is below the average usage frequency;
   based at least in part on the first usage frequency being below the average usage frequency, causing functionality of the application to be limited with respect to the profile;
   generating first audio data indicating the functionality has been limited;
   causing a device, associated with the profile, to output the first audio data;
   after causing the device to output the first audio data, receiving, from the device, second audio data representing a spoken utterance;
   performing speech processing on the second audio data to determine the spoken utterance requests re-enablement of the functionality with respect to the profile; and
   causing the functionality to be re-enabled with respect to the profile.

2. The computer-implemented method of claim 1, wherein:
   causing the functionality to be limited comprises deactivating a permission corresponding to the application and the profile, the permission corresponding to an ability of the application to access certain data associated with the profile;

the first audio data comprises a portion indicating the permission was deactivated;

the spoken utterance requests reactivation of the permission; and causing the functionality to be re-enabled comprises reactivating the permission.

3. The computer-implemented method of claim 1, further comprising:

determining a standard deviation from the average usage frequency;

determining a second usage frequency corresponding to the average usage frequency minus the standard deviation; and determining the first usage frequency is below the second usage frequency, wherein causing the functionality to be limited is further based at least in part on the first usage frequency being below the second usage frequency.

4. The computer-implemented method of claim 1, wherein:

when the first usage frequency corresponds to a first period of time of nonuse of the application, causing the functionality to be limited comprises deactivating a first permission to prevent the application from having access to first user information associated with the profile; and when the first usage frequency corresponds to a second period of time of nonuse of the application, the second period of time being longer than the first period of time, causing the functionality to be limited comprises deactivating a second permission to prevent the application from having access to second user information associated with the profile, the second user information being less sensitive than the first user information.

5. A system comprising:

at least one processor; and at least one memory including instructions that, when executed by the at least one processor, cause the system to:

determine a first usage frequency associated with an application, the first usage frequency being specific to a profile;

determine, with respect to the application, a comparison usage frequency based at least in part on usage frequencies corresponding to a plurality of users;

determine the first usage frequency deviates from the comparison usage frequency;

based at least in part on the first usage frequency deviating from the comparison usage frequency, cause functionality of the application to be limited with respect to the profile;

cause a device to output first data indicating the functionality was limited;

after causing the device to output the first data, receive, from the device, audio data representing a spoken utterance;

perform speech processing on the audio data to determine the spoken utterance requests re-enablement of the functionality with respect to the profile; and cause the functionality to be re-enabled with respect to the profile.

6. The system of claim 5, wherein the at least one memory further includes instructions that, when executed by the at least one processor, further cause the system to:

cause at least one permission associated with the application to be deactivated with respect to the profile, wherein the first data indicates the at least one permission was deactivated with respect to the profile, wherein the spoken utterance requests reactivation of the at least one permission with respect to the profile, and wherein the at least one permission is reactivated with respect to the profile.

7. The system of claim 5, wherein the at least one memory further includes instructions that, when executed by the at least one processor, further cause the system to:

cause the device to delete the application;

cause the device to output second data indicating the application was deleted;

after causing the device to output the second data, receive, from the device, second audio data representing a second spoken utterance;

perform speech processing on the second audio data to determine the second spoken utterance requests re-downloading of the application; and cause the device to re-download the application.

8. The system of claim 5, wherein the at least one memory further includes instructions that, when executed by the at least one processor, further cause the system to:

select, from a plurality of permissions associated with the application, a first permission for deactivation based at least in part on a period of time of nonuse of the application represented in the first usage frequency.

9. The system of claim 5, wherein the at least one memory further includes instructions that, when executed by the at least one processor, further cause the system to:

when the first usage frequency corresponds to a first period of time of nonuse of the application, deactivate a first permission to prevent the application from having access to first user information associated with the profile; and when the first usage frequency corresponds to a second period of time of nonuse of the application, the second period of time being longer than the first period of time, deactivate a second permission to prevent the application from having access to second user information associated with the profile, the second user information being less sensitive than the first user information.

10. The system of claim 5, wherein the at least one memory further includes instructions that, when executed by the at least one processor, further cause the system to:

generate text data indicating the functionality was limited; and perform text-to-speech processing (TTS) on the text data to generate the first data.

11. The system of claim 5, wherein the at least one memory further includes instructions that, when executed by the at least one processor, further cause the system to:

perform speech recognition processing on the audio data to generate text data; and perform natural language processing on the text data to determine the spoken utterance requests re-enablement of the functionality with respect to the profile.

12. The system of claim 5, wherein the at least one memory further includes instructions that, when executed by the at least one processor, further cause the system to:

determine the comparison usage frequency further based at least in part on at least one of:

a type of the application; or a standard usage frequency received from a second device.

13. A computer-implemented method comprising:
- determining a first usage frequency associated with an application, the first usage frequency being specific to a profile;
- determining, with respect to the application, a comparison usage frequency based at least in part on usage frequencies corresponding to a plurality of users;
- determining the first usage frequency deviates from the comparison usage frequency;
- based at least in part on the first usage frequency deviating from the comparison usage frequency, causing functionality of the application to be limited with respect to the profile;
- causing a device to output first data indicating the functionality was limited;
- after causing the device to output the first data, receiving, from the device, audio data representing a spoken utterance;
- performing speech processing on the audio data to determine the spoken utterance requests re-enablement of the functionality with respect to the profile; and
- causing the functionality to be re-enabled with respect to the profile.

14. The computer-implemented method of claim 13, wherein:
- causing the functionality to be limited comprises causing at least one permission associated with the application to be deactivated with respect to the profile;
- the first data indicates the at least one permission was deactivated with respect to the profile;
- the spoken utterance requests reactivation of the at least one permission with respect to the profile; and
- causing the functionality to be re-enabled comprises causing the at least one permission to be reactivated with respect to the profile.

15. The computer-implemented method of claim 13, further comprising:
- causing the device to delete the application;
- causing the device to output second data indicating the application was deleted;
- after causing the device to output the second data, receiving, from the device, second audio data representing a second spoken utterance;
- performing speech processing on the second audio data to determine the second spoken utterance requests re-downloading of the application; and
- causing the device to re-download the application.

16. The computer-implemented method of claim 13, further comprising:
- selecting, from a plurality of permissions associated with the application, a first permission for deactivation based at least in part on a period of time of nonuse of the application represented in the first usage frequency.

17. The computer-implemented method of claim 13, wherein:
- when the first usage frequency corresponds to a first period of time of nonuse of the application, causing the functionality to be limited comprises deactivating a first permission to prevent the application from having access to first user information associated with the profile; and
- when the first usage frequency corresponds to a second period of time of nonuse of the application, the second period of time being longer than the first period of time, causing the functionality to be limited comprises deactivating a second permission to prevent the application from having access to second user information associated with the profile, the second user information being less sensitive than the first user information.

18. The computer-implemented method of claim 13, further comprising:
- generating text data indicating the functionality was limited; and
- performing text-to-speech processing (TTS) on the text data to generate the first data.

19. The computer-implemented method of claim 13, further comprising:
- performing speech recognition processing on the audio data to generate text data; and
- performing natural language processing on the text data to determine the spoken utterance requests re-enablement of the functionality with respect to the profile.

20. The computer-implemented method of claim 13, wherein the comparison usage frequency is determined further based at least in part on at least one of:
- a type of the application; or
- a standard usage frequency received from a second device.

* * * * *